March 1, 1938. C. J. BROTSKER ET AL 2,109,967
EXTENSION FOR FISHING LINES
Filed Feb. 1, 1937
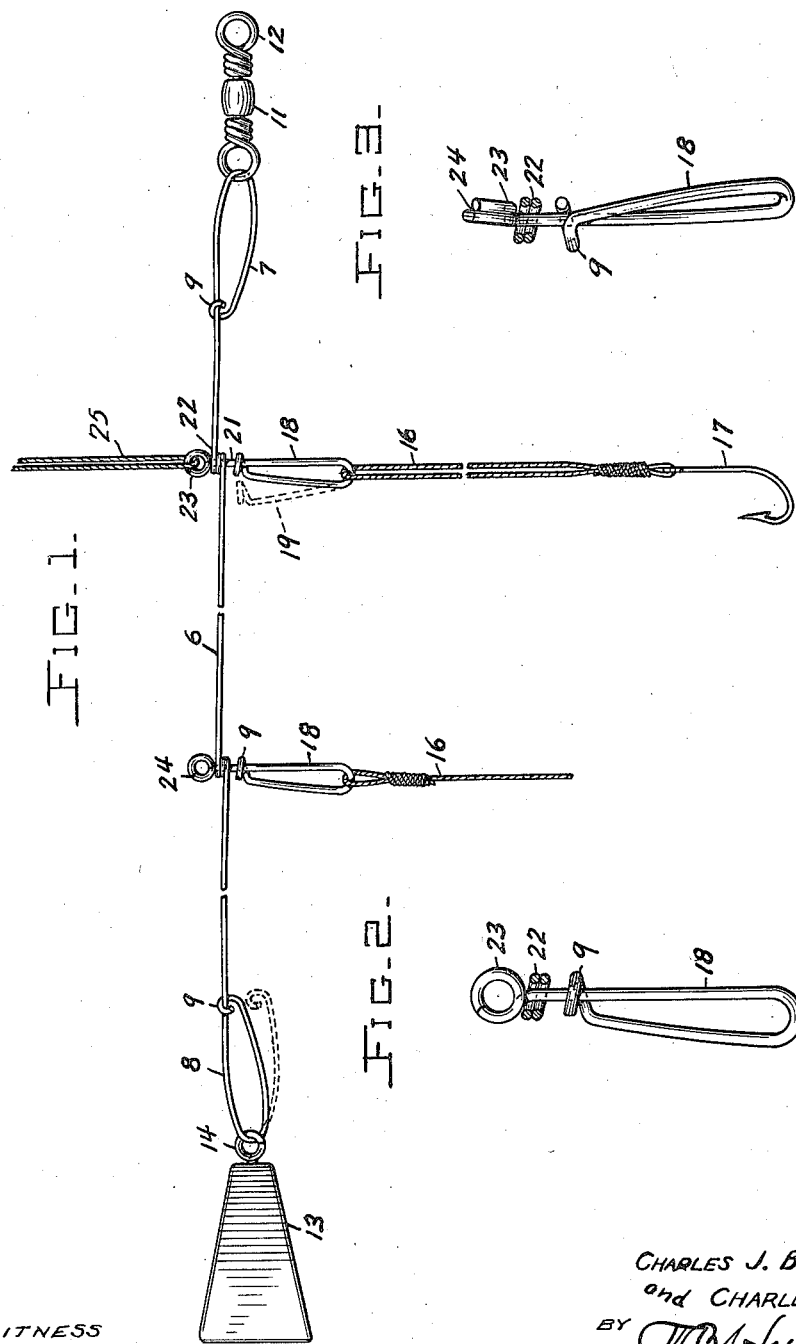
INVENTORS
CHARLES J. BROTSKER
and CHARLES O. MEYER
BY
ATTORNEY
WITNESS Patented Mar. 1, 1938

2,109,967

UNITED STATES PATENT OFFICE 2,109,967

EXTENSION FOR FISHING LINES

Charles J. Brotsker and Charles C. Meyer,
Upper Darby, Pa.

Application February 1, 1937, Serial No. 123,392

3 Claims. (Cl. 43—28)

This invention relates to extensions for fishing lines, and more particularly to an extension which is semi-flexible whereby snarls and the like will be eliminated.

The primary object of this invention is to provide an extension for fishing lines incorporating means whereby the necessary paraphernalia for fishing may be readily attached thereto, and the same directly connected with a silk, cotton, linen or other fishing line.

A further object of the invention is to provide an extension whereby the sinker and hooks may be connected without tying the same thereto, and in such manner that they may be readily detached or changed.

A still further object of the invention is to provide an extension in which the fishing hook connecting means are adapted to swivel or turn freely.

Still another object of the invention is to provide the primary fishing hook attaching means with an additional part whereby the leader from an additional hook may be readily connected therewith.

According to the invention, the fishing line extension, which is made from piano wire or the like, is provided at its one end with closable hook means for connecting a swivel which in turn is connected with the line, closable hook means for connecting the leaders of the fishing hooks, said means provided with a shank loosely encircled by the material of the extension and provided with eyelet means for connecting an additional leader, and closable hook means on the other end of said extension for securing a weight or sinker thereto.

The drawing illustrates an embodiment of the invention and the views therein are as follows:—

Figure 1 is a longitudinal view of the extension partly broken away showing part of the paraphernalia connected thereto, Figure 2 is a front elevation of one of the closable hook means for connecting the fishing hook leaders, and Figure 3 is a side view of the same.

According to the drawing, and as particularly shown in Figure 1, the fishing line extension 6 is provided at its ends with closable hook members 7 and 8. These members comprise loops which have small hooks 9 on the extreme ends of the wire for slipping over the main length of the extension, and preventing the loop from opening, except when desired.

In the drawing, an ordinary swivel 11 has been shown connected with the closable hook member 7, and as the small hook 9 is slipped over the body of the extension 6, this swivel is securely fastened to said extension. The other end of the swivel 12 is connected with the fishing line.

The sinker or weight 13 has been shown as provided with an eyelet 14 for connection with the closable hook member 8 on the other end of said extension, but it will be readily seen that sinkers or weights which have holes extending through the same may be connected in the same fashion with said extension.

The leaders 16 from the fishing hooks 17 are connected to closable hook members 18, as shown in Figure 1, and the dotted lines at 19 illustrate the condition of the hook member when the same is open for passing the loop of the leader 16 into said hook member.

The straight shank 21 of said member passes through encirclings 22 of the extension and the extreme end of said hook member is spiraled, as shown in Figures 2 and 3, to provide an eyelet 23. This eyelet may be utilized for pressing a leader 25 of a fish hook between the turns and outlet point 24 shown in Figure 3 whereupon it may be passed around until the same falls into said eyelet.

It will, of course, be understood that the encirclings 22 of the extension are of such diameter as to loosely embrace the shank 21 of the fishing hook connecting members which will thus permit these members to swivel freely so that in case live bait is placed upon the hooks, the bait may swing around in the water without causing any entanglement of the leader 16.

The extension is made preferably of non-corrosive wire, and for this purpose tinned piano wire of the desired flexibility and gauge has been successfully used.

The extension with its closable hook members provides a fishing line extension to which the weight or sinkers and the hooks of desired number may be readily attached and detached from the same without in any way mutilating the leaders of the hooks which are usually made of gut or like material, and are quite easily fractured.

Of course, the extension illustrated may be modified in various ways without departing from the invention herein set forth and hereafter claimed.

The invention is hereby claimed as follows:—

1. A fishing line extension comprising a single spring wire having loops adjacent the ends thereof and the ends bent to form closing means for said loops, and closable hooks intermediate said loops and attached to said wire by twisting the same longitudinally around a part of said hooks.

2. A fishing line extension comprising a single spring wire having loops formed adjacent the extreme ends thereof and the ends bent to form locking means for said loops, and members for attaching fishing hook leaders, said members being swivelly mounted on said wire by longitudinal twists formed in said wire.

3. A fishing line extension comprising a single spring wire having loops formed adjacent the extreme ends thereof and said ends bent to form locking means for said loops, fishing hook leader connecting means comprising a loop embodying means for closing the same, a shank swivelly mounted on said wire by means of longitudinal turns of said wire around said shank, and an eyelet on one end of said shank for receiving the leader of another fishing hook.

CHARLES J. BROTSKER.
CHARLES C. MEYER.